UNITED STATES PATENT OFFICE.

ALEXANDER CLASSEN, OF AACHEN, GERMANY.

CONVERSION OF WOOD OR OTHER CELLULOSE MATERIAL INTO GLUCOSE AND OTHER SOLUBLE AND INSOLUBLE CARBOHYDRATES.

1,101,061.  Specification of Letters Patent.  Patented June 23, 1914.

No Drawing.  Application filed November 11, 1912. Serial No. 730,537.

*To all whom it may concern:*

Be it known that I, ALEXANDER CLASSEN, a citizen of Germany, residing at Aachen, in the Empire of Germany, have invented certain new and useful Improvements in Conversion of Wood or other Cellulose Material into Glucose and other Soluble and Insoluble Carbohydrates, of which the following is a specification.

The object of my invention is to effect certain economies in the conversion of wood and other cellulose material into other carbohydrates by the use of sulfurous and sulfuric acids. When sulfurous acid alone is employed for this purpose, the quantity of sulfuric acid necessary to effect the conversion is formed by oxidizing the sulfurous acid. This oxidation is effected by introducing air, oxygen, or a substance yielding oxygen, and raising the reagents to the temperature necessary to secure an efficient reaction.

I have found that by the use of catalytic agent, such as finely divided platinum, or other metals, or finely divided ferric oxid, the formation of sulfuric acid is more readily effected, and that the operation may be conducted at a lower temperature and by the use of smaller quantities of sulfurous acid, and that, furthermore, a larger yield of sugar and other carbohydrates is secured when the operation is conducted in the presence of a catalytic agent.

As a specific example of one mode of carrying out my process, I have used 100 kilograms of wood containing from 15 to 50 per cent. of moisture, and 15 to 20 kilograms of an aqueous solution of sulfurous acid saturated at the ordinary temperature. The mass is heated to a temperature of from 110 to 135 degrees centigrade in a slowly turning closed vessel for a period of thirty to sixty minutes, a suitable quantity of a catalytic agent being inclosed in the vessel, together with the other substances mentioned. After the conversion has been effected, the undecomposed sulfurous acid is blown out, taken up in water and employed in other converting operations. The product of the conversion contains in addition to glucose other soluble and insoluble carbohydrates.

The glucose may be separated and used for any purpose for which glucose is adapted in the arts and industries, or the entire mass may be mixed with other food stuffs and used for feeding animals.

What I claim is:

1. A process for converting wood and other cellulose material into sugar and other carbohydrates, which comprises the introduction of the wood or other cellulose material into a vessel, together with sulfurous acid, water and a catalytic agent, and the heating of said substances to a temperature of from 110 degrees to 135 degrees centigrade.

2. A process for converting wood and other cellulose material into sugar and other carbohydrates, which comprises the introduction of the wood or other cellulose material into a vessel, together with sulfurous acid, water and a catalytic agent, and the heating of said substances to a suitable temperature.

In testimony whereof, I have subscribed my name.

ALEXANDER CLASSEN.

Witnesses:
HEINRICH CLOEREN,
KUNS WOLF.